(12) United States Patent
Simon et al.

(10) Patent No.: US 8,094,944 B2
(45) Date of Patent: Jan. 10, 2012

(54) EFFICIENT MODEL-BASED RECOGNITION OF OBJECTS USING A CALIBRATED IMAGE SYSTEM

(75) Inventors: Christian Simon, Laval (CA); Djamel Yahia Meddah, Montreal (CA); Stéphane Baldo, Montreal (CA)

(73) Assignee: Matrox Electronic Systems Ltd., Dorval (CA)

(*) Notice: Subject to any disclaimer, the term of this patent is extended or adjusted under 35 U.S.C. 154(b) by 0 days.

(21) Appl. No.: 12/499,656

(22) Filed: Jul. 8, 2009

(65) Prior Publication Data
US 2009/0268967 A1      Oct. 29, 2009

Related U.S. Application Data

(62) Division of application No. 10/478,306, filed as application No. PCT/CA01/01081 on Jul. 27, 2001, now Pat. No. 7,574,045.

(60) Provisional application No. 60/295,595, filed on Jun. 5, 2001.

(51) Int. Cl.
*G06K 9/46* (2006.01)

(52) U.S. Cl. ........ 382/195; 345/420; 345/427; 345/633; 348/231.5

(58) Field of Classification Search ........................ None
See application file for complete search history.

(56) References Cited

U.S. PATENT DOCUMENTS

| | | | | |
|---|---|---|---|---|
| 4,727,471 A * | 2/1988 | Driels et al. | ..................... | 700/66 |
| 5,307,419 A * | 4/1994 | Tsujino et al. | ................ | 382/153 |
| 5,329,310 A * | 7/1994 | Liljegren et al. | ............. | 348/147 |
| 5,369,714 A * | 11/1994 | Withgott et al. | ............. | 382/177 |
| 5,491,760 A * | 2/1996 | Withgott et al. | ............. | 382/203 |
| 5,706,419 A * | 1/1998 | Matsugu et al. | ............. | 345/420 |
| 5,729,471 A * | 3/1998 | Jain et al. | ...................... | 725/131 |
| 5,768,443 A * | 6/1998 | Michael et al. | ............... | 382/294 |
| 5,835,241 A * | 11/1998 | Saund | ........................... | 358/488 |
| 5,875,264 A * | 2/1999 | Carlstrom | ..................... | 382/181 |
| 5,903,261 A * | 5/1999 | Walsh et al. | .................. | 715/201 |
| 5,960,125 A * | 9/1999 | Michael et al. | ............... | 382/294 |
| 5,978,521 A * | 11/1999 | Wallack et al. | ............... | 382/294 |
| 6,173,066 B1* | 1/2001 | Peurach et al. | ............... | 382/103 |
| 6,275,613 B1* | 8/2001 | Aiger | ........................... | 382/195 |
| 6,542,840 B2* | 4/2003 | Okamoto et al. | ............. | 702/94 |
| 7,027,651 B2* | 4/2006 | Simon et al. | .................. | 382/217 |
| 7,327,888 B2* | 2/2008 | Simon et al. | .................. | 382/217 |
| 2001/0012985 A1* | 8/2001 | Okamoto et al. | ............. | 702/94 |
| 2002/0094509 A1* | 7/2002 | Durbin et al. | ................. | 433/213 |
| 2010/0097375 A1* | 4/2010 | Tadaishi et al. | .............. | 345/420 |

OTHER PUBLICATIONS

Hong et al., "An Improved Model-Based Matching Method Using Footprints," Nov. 14-17, 1988, IEEE vol. 1, pp. 72-78.*
Eric Rose et al., "Annotating Real-World Objects Using Augmented Reality," 1994, European Comuputer-Industry Research Centre GmbH, ECRC-94-41; pp. 1-17.*

* cited by examiner

*Primary Examiner* — John Lee
(74) *Attorney, Agent, or Firm* — Norton Rose OR LLP (57) ABSTRACT

A model-based object recognition system operates to recognize an object on a predetermined world surface within a world space. An image of the object is acquired. This image is a distorted projection of the world space. The acquired image is processed to locate one or more local features of the image, with respect to an image coordinate system of the image. These local features are mapped a world coordinate system of the world surface, and matched to a model defined in the world coordinate system. Annotations can be arranged as desired relative to the object in the world coordinate system, and then inverse-mapped into the image coordinate system for display on a monitor in conjunction with the acquired image. Because models are defined in world coordinates, and pattern matching is also performed in world coordinates, one model definition can be used by multiple independent object recognition systems.

5 Claims, 7 Drawing Sheets

EFFICIENT MODEL-BASED RECOGNITION OF OBJECTS USING A CALIBRATED IMAGE SYSTEM

CROSS-REFERENCE TO RELATED APPLICATIONS

The present application is a divisional and claims priority under 35 USC §120 of U.S. patent application Ser. No. 10/478,306, filed on Dec. 4, 2003 now U.S. Pat. No. 7,574,045 which is a national phase entry of International patent application no. PCT/CA01/01081, filed on Jul. 27, 2001 which claims priority of U.S. Provisional patent application No. 60/295,595, filed on Jun. 5, 2001, the contents of which are hereby incorporated by reference.

TECHNICAL FIELD

This invention relates to model-based object recognition, and in particular to efficient model-based recognition of an object using a calibrated visual environment.

BACKGROUND OF THE INVENTION

Techniques of visual object (and/or pattern) recognition are increasingly important in automated manufacturing, biomedical engineering, cartography and many other fields. Model-based recognition techniques typically must solve the problem of finding, in an image acquired by a camera, an occurrence of a previously defined model that has been affected by affine transformation. Affine transformations may be defined as transformations in which straight lines remain straight and parallelism is preserved. Angles however, may undergo changes and differential scale changes may be introduced.

Images, which are the projection of a three-dimensional world onto a plane are dependant on the position, orientation and the intrinsic properties of the camera which is acquiring the image. Image distortions might be introduced by different scale factors in the X and Y directions. Perspective distortions might be introduced due to the optical axis of the camera's lens being at an oblique angle to the object plane. Distortion might also be introduced by optical imperfections of the camera's lens. Finally, distortions might appear because the object is not seated on a planar surface.

Known object recognition algorithms process acquired images to find an occurrence of a match between an image and a model that is subject to affine transformation. When images are distorted (e.g. due to perspective, lens distortion, etc.) finding a match with the model requires, from the matching algorithm, more than affine transformation capability.

Geometric hashing, as described in "Affine Invariant Model-Based Object Recognition" (Y. Lamdan, J. T. Schwartz, H. J. Wolfson, IEEE Transactions on Robotics and Automation, Vol. 6, No. 5. October 1990), generalized Hough transform, as described in "Computer Vision" (D. H. Ballard, C. M. Brown, pp. 128-131, Prentice Hall 1982B), and other geometric based pattern matching methods that work in the presence of affine transformations are sensitive to image distortions because of their global nature. In fact, these methods are based on a global description of the model, which is altered by perspective and non-linear distortions. Consequently, distortion introduces errors that may result in failure of these methods. Even when occurrences of a model are correctly identified, the position, angle and scale of the occurrences are frequently inaccurate.

When used with a known object or world surface, camera calibration can be considered as the definition of a one-to-one mapping (or a transformation function) between the world surface and its distorted projection in "image space". As such, the transformation function maps any coordinates in the image coordinate system of the image space to corresponding world coordinates in the known world surface and vice-versa. Well-known methods of camera calibration are described by Tsai (R. Tsai, "A Versatile Camera Calibration Technique for High Accuracy 3D Machine Vision Metrology Using Off the Shelf TV Cameras and Lenses", IBM Research Report, RC 11413, 1985) and by Faugeras (O. Faugeras, "Three Dimensional Computer Vision, A Geometric Point Of View", chap 3: "Modeling and calibrating cameras", pp. 33-68. MIT Press 1993).

When image distortion is negligible, camera calibration can be used to convert results from an operation performed in the image to the real world coordinate system of the user. For example, an acquired image can be processed (in image space coordinates) to estimate the location of the object (in world space). This information can then be used to control a robot arm (operating in world space coordinates) to pick up the object. However, for such operations image distortions can prevent the operation from being performed correctly (or accurately).

One method to deal with image distortions is to calibrate and warp an acquired image to obtain a comparatively non-distorted image, prior to applying a pattern matching algorithm to find model occurrences. All processing of image features is done in the calibrated "non-distorted image space". Results are computed in the "non-distorted image space", and then transformed to world space coordinates for display to a user (and/or controlling other operations). However, processing an acquired image to obtain a non-distorted image requires intensive image processing, which slows down the speed at which an object can be recognized. In addition, pixel values of the "non-distorted image" must be interpolated from pixel values of the acquired image. This interpolation also introduces its own imprecision, thereby degrading precision of the subsequent matching operations.

Accordingly, a method and apparatus enabling efficient recognition of an object remains highly desirable.

SUMMARY OF THE INVENTION

An object of the invention is to provide a method and apparatus enabling efficient recognition of an object located within a predetermined world space.

Accordingly, an aspect of the present invention provides an image processing system for recognizing an object within a predetermined world space. The system includes means for acquiring an image of the object, the image comprising a distorted projection of the world space; means for analyzing the acquired image to locate one or more local features of the image, with respect to an image coordinate system of the image; means for mapping the local features into a world coordinate system of the world space; and means for matching the mapped local features to a model defined in the world coordinate system.

Another aspect of the present invention provides a method of recognizing an object within a predetermined world space. An image of the object, in the form of a distorted projection of the world space, is acquired. The acquired image is then analyzed to locate one or more local features of the image, with respect to an image coordinate system of the image.

These local features are mapped into a world coordinate system of the world space, and matched to a model defined in the world coordinate system.

The image may be acquired by any one of: an optical imaging device (such as, for example, a digital camera); an electromagnetic imaging device (e.g. a radar system or a nuclear magnetic resonance imaging system) and an ultrasonic imaging device.

The acquired image may be processed by a processor adapted to: identify a plurality of local features within the image; and estimate a location of each local feature with respect to the image coordinate system. Each local feature may be an edge point, or an edge discontinuity.

Mapping of the local features into the world coordinate system may be accomplished using a translation function designed to translate coordinates in the image coordinate system into corresponding coordinates in the world coordinate system. An inverse translation function for translating coordinates in the world coordinate system into corresponding coordinates in the image coordinate system may also be provided.

A further aspect of the present invention provides a method of annotating an image of an object located in a predetermined world space of an image processing system. The image processing system is designed to estimate at least a location of the object in the world space, and includes a monitor for displaying the image. In accordance with this aspect of the invention, an annotation is defined in the world coordinate system of the world space. This annotation is positioned relative to at least the estimated location of the object. The annotation is then piece-wise mapped into the image space corresponding to the image of the object, and displayed on the monitor in conjunction with the image.

In some embodiments, the annotation may include an envelope in the world coordinate system encompassing the estimated location of the object in the world space. In such cases, the envelope may be provided as a polygon (e.g. a rectangle) and an ellipsoid (such as a circle or an ellipse) surrounding the estimated location of the object in the world space. Alternatively, the annotation may include a wire-frame drawing tracing at least a portion of an outline of the object in the world space. In either case, the image processing system may be designed to estimate an orientation of the object in the world space. With such a system, the annotation can be oriented in the world coordinate system to approximate the estimated orientation of the object in the world space.

The annotation may also include any one of an indicator positioned at the estimated location of the object in the world space, and text information positioned at a predetermined location relative to the estimated location of the object in the world space.

Piece-wise mapping the annotation may be accomplished by: segregating the annotation into a plurality of local elements. These local elements can then be mapped into the image space. Finally, the mapped local elements can be desegregated within the image space, in order to close any gaps between adjacent elements that may have been introduced by the mapping process.

The mapped annotation can then be displayed by writing the annotation into either an overlay buffer or a display buffer associated with the monitor.

A further aspect of the present invention provides a method of managing at least two independent image processing systems. Each image processing system is designed for model-based recognition of an object within a respective world space. In accordance with this aspect of the invention, a model of the object is defined with respect to a predetermined world coordinate system. Each image processing system then operates independently to calibrate to a respective world space comprising the predetermined world coordinate system; and then perform model-based recognition of objects within the respective world space using the model.

The model is defined using a selected one of the image processing systems, or may be defined independently of the image processing systems. A respective instance of the model is provided (e.g. copied and stored locally) for each image processing system. Alternatively, a common instance of the model may be provided, and accessed by two or more image processing systems (e.g. through a network).

Thus the present invention provides a model-based object recognition system which operates to recognize an object on a predetermined world surface within a world space. An image of the object is acquired. This image is a distorted projection of the world space. The acquired image is processed to locate one or more local features of the image, with respect to an image coordinate system of the image. These local features are mapped a world coordinate system of the world surface, and matched to a model defined in the world coordinate system. Annotations can be arranged as desired relative to the object in the world coordinate system, and then inverse-mapped into the image coordinate system for display on a monitor in conjunction with the acquired image. Because models are defined in world coordinates, and pattern matching is also performed in world coordinates, one model definition can be used by multiple independent object recognition systems.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
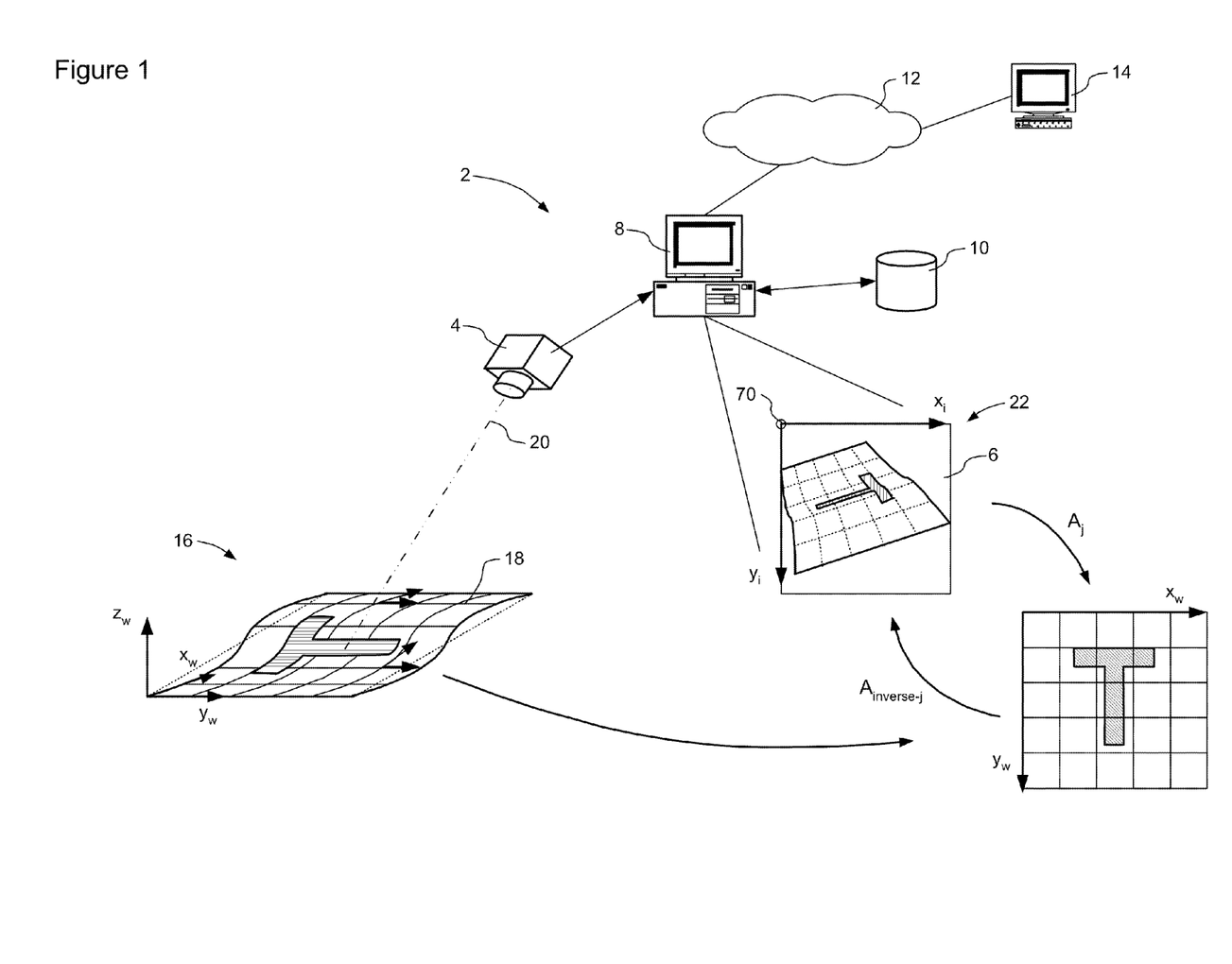
FIG. 1 is a block diagram schematically illustrating principle elements of a system in accordance with an embodiment of the present invention.

The present invention provides a method and apparatus enabling efficient recognition of an object using a calibrated visual environment. FIG. 1 is a schematic diagram illustrating principle elements of an exemplary system in accordance with the present invention.

As shown in FIG. 1, the system 2 comprises an image acquisition device 4 for acquiring an image 6; a processor 8 for analyzing the acquired image 6 (and, if desired, displaying the acquired image and/or any analysis results); and a database 10 containing model data respecting one or more models. The processor 8 can be provided as any suitable combination of hardware and software, such as, for example, a suitably programmed general purpose computer. If desired, the processor 8 can be linked through a network 12 (e.g. a LAN or the internet) to a remote workstation 14, as will be described in greater detail below. The database 10 may be stored within the processor 8, or, if desired, stored at a remote location and accessible by the processor 8 through the network 12, for example.

The image acquisition device 4 (which may, for example, be a digital camera) is arranged to acquire an image of a desired field of view within a predetermined "world space" 16 of the system. This world space 16 may, for example, be defined within an inspection station (not shown) of a production line, in order to enable recognition and identification of objects passing through the inspection station. It will be appreciated that other types of image acquisition devices (e.g., electromagnetic imaging devices such as radar and nuclear magnetic resonance imaging systems; or ultra-sonic imaging systems etc.) may be employed, as may be appropriate for the desired view. In any event, the world space 16 definition includes a "world surface" 18 (which may be a physical or a virtual surface) providing a visual reference frame, and a world coordinate system (which may be two-dimensional or three-dimensional, as desired) defined relative to the world surface 18.

In general, the system 2 operates to recognize objects laying on (or approximately parallel to) the world surface, as viewed from the image acquisition device 4. In this respect, a highly precise alignment between the world surface and an object to be recognized is not essential. Accordingly, the world surface 18 can have virtually any arbitrary geometry (provided that all portions of the world surface 18 are visible by the image acquisition device 4), which is suitably selected in accordance with the expected geometrical characteristics of objects that are to be recognized. For example, substantially planar objects are most readily recognized using a substantially planar world surface 18. On the other hand, if it is desired to recognize, for example a label printed (or otherwise affixed) to a bottle, then a semi-cylindrical world surface may be suitably selected. Similarly, a semi-spherical world surface may be used in cases where it is desired to recognize, for example a label printed on a ball. In either case, the world coordinate system is suitably selected in accordance with the world surface 18, so that the world surface is topologically flat with respect to the world coordinate system. For the purposes of illustrating the present invention, in the embodiment illustrated in FIG. 1, the world surface 18 is a one-dimensionally curved rectangular surface lying within a three-dimensional world space 16. The world coordinate system is defined as a 2-D orthogonal coordinate system defined relative to the world surface 18, which allows the world surface to be mathematically "unwarped", as will be described in greater detail below.

As shown in FIG. 1, the image acquisition device 4 is arranged to acquire an image 6 of the world space 16 along a viewing axis 20 oriented at an arbitrary oblique angle relative to the world surface 18. As is well known in the art, an image acquired by a camera 4 is a two-dimensional projection of the (3-D) world space. It is therefore convenient to define a 2-D "image space" 22, which encompasses the acquired image 6, and includes a suitable image coordinate system for locating features within the image 6. Any object located in the 3-D world space 16 will be projected into the 2-D image space 22.

The image coordinate system can be arbitrarily defined with respect to the acquired image 6. However, where the acquired image is composed of orthogonal rows and columns of pixels, it is preferable to define the image coordinate system having two orthogonal axes corresponding with the rows and columns of the image, as shown in FIG. 1. The origin 70 of the image coordinate system may be located anywhere on the image 6. In the embodiment of FIG. 1, the origin 70 of the image coordinate system is located in the upper-left corner of the image 6.

As may be seen in FIG. 1, the image 6 acquired by the camera 4 normally includes distortions due to rotation, scaling, perspective and optical imperfections of the camera 4. In order to mitigate any effects of these distortions, a calibrated visual environment is produced by calculating a transformation function $A_j$ (where the subscript "j" is an index of the image acquisition device 4, and would therefore be relevant in a multi-camera system) for mapping coordinates of the image coordinate system into corresponding coordinates in the world coordinate system. (i.e., between the 2-D planar image 6 and the curved world surface 18). An inverse transformation function $A_{inverse-j}$ is also calculated, for mapping coordinates of the world coordinate system into corresponding coordinates in the image coordinate system. Various known methods may be suitably used to calculate each of the transformation function $A_j$ and inverse transformation function $A_{inverse-j}$.

Figure 2A:
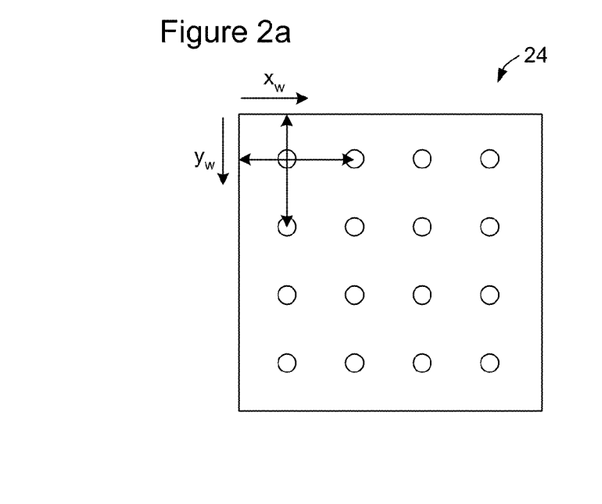
FIGS. 2a-c schematically illustrate calibration of the visual environment of FIG. 1.
Figure 2B:
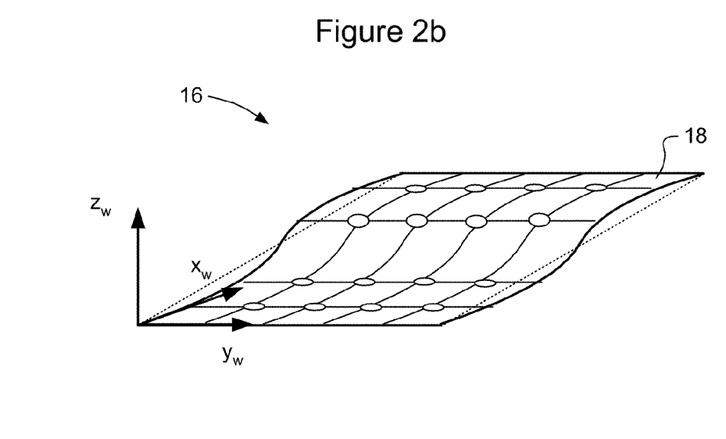
Figure 2C:
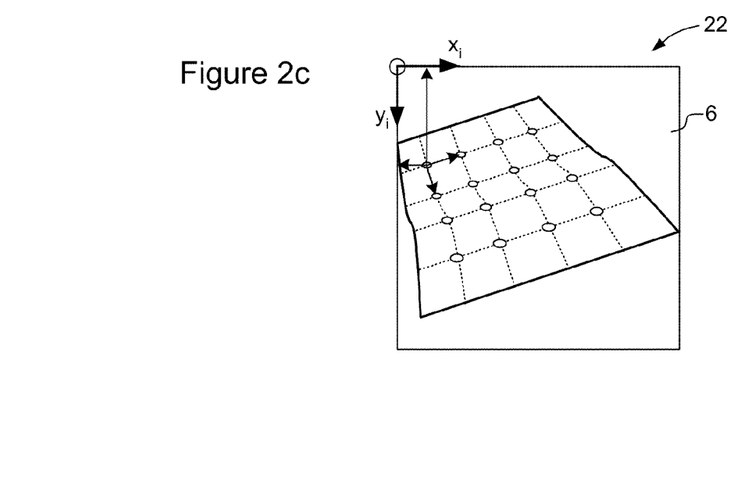

Calibration of the system 2 can conveniently be accomplished using a known calibration frame, such as, for example, a calibration grid, arranged on the world surface 18. FIG. 2a illustrates an exemplary calibration grid 24 that may be used for this purpose. The calibration grid 24 of FIG. 2a is provided as a symmetrical 2-D matrix of dots defined in the world coordinate system and disposed on the world surface 18, as shown in FIG. 2b. As shown in FIG. 2c, the image 6 acquired by the camera 4 will include distortions due to curvature of the world surface 18, perspective, optical imperfections of the image acquisition device 4, as well as rotation and scale. Because the characteristics (e.g. the dimensions and layout in world coordinates) of the calibration grid 24 are precisely known, $A_j$ and $A_{inverse-j}$ can be readily calculated by matching the image of the grid acquired by the camera 4 with its known characteristics. Suitable techniques for calculating $A_j$ and $A_{inverse-j}$ are described by Tsai ("A Versatile Camera Calibration Technique for High Accuracy 3D Machine Vision Metrology Using Off the Shelf TV Cameras and Lenses", IBM Research Report, RC 11413, 1985"), and Faugeras ("Three Dimensional Computer Vision, A Geometric Point Of View", chap 3: "Modeling and calibrating cameras", pp. 33-68. MIT Press 1993").

Figure 3:
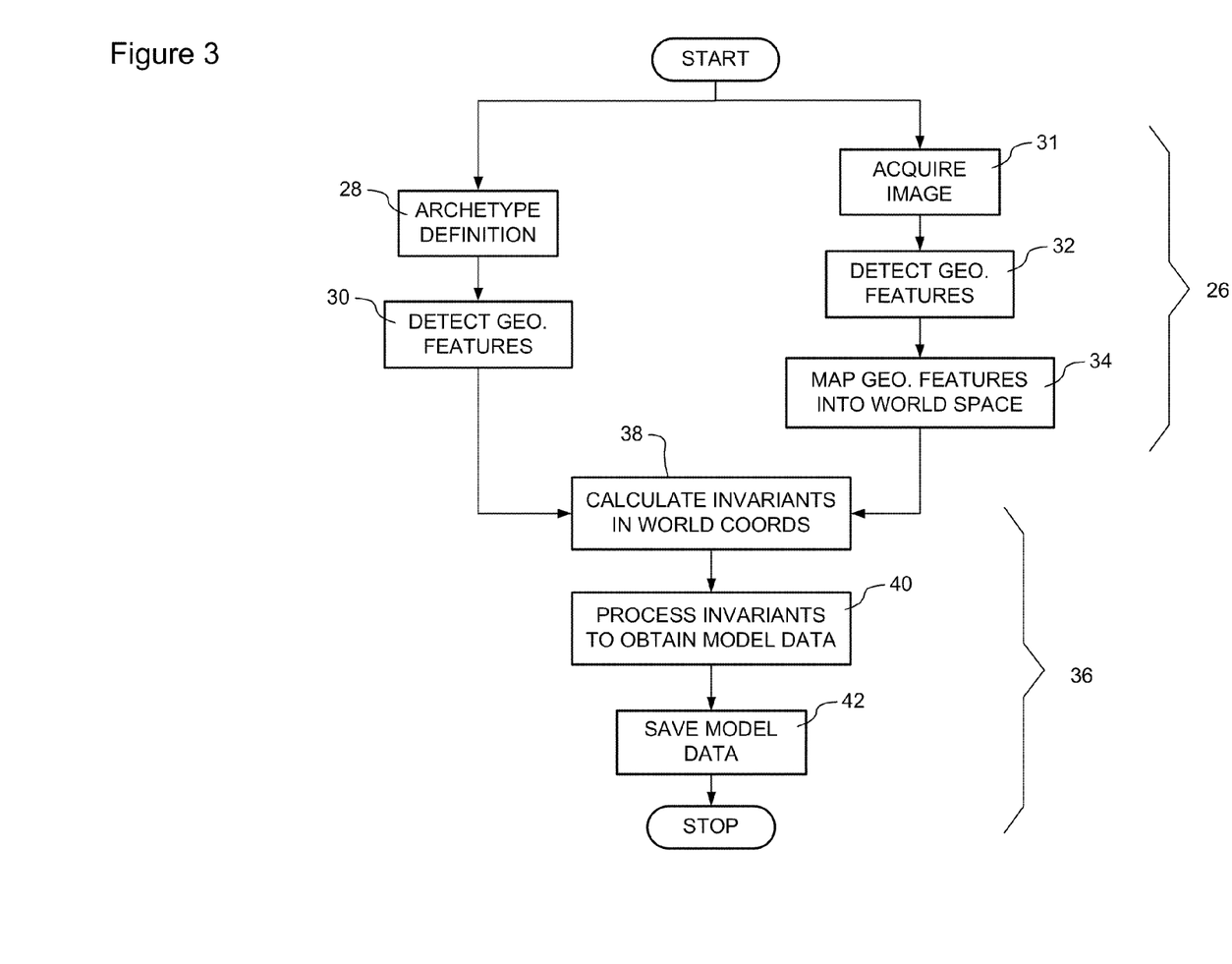
FIG. 3 is a flow chart illustrating principle steps in a process of acquiring model data in accordance with the present invention.

FIG. 3 is a flow chart illustrating principle steps in a process for defining model data which can be used for subsequent recognition of objects within the world space 16. As an initial step (indicated generally at 26), geometric features uniquely associated with a selected archetype are obtained. As shown in FIG. 3, two alternative methods may be used to accomplish this task. In one method, a synthetic description of the archetype is obtained (at 28). Such a synthetic description may take any of a variety of forms, such as, for example, a line drawing produced using a computer aided drafting (CAD) software program, or an associated drawing file output by the CAD program. In any event, the synthetic description is analyzed (at 30) to detect geometric features of the archetype. These geometric features may be edge points, edge discontinuities, or any other local geometric features uniquely representing, as a set, the shape of the archetype. In order to simplify the present description, $M_i$ will be used to represent the set of extracted geometric features of the archetype (where the subscript i represents an index of the archetype). It will be appreciated that the synthetic description will normally be defined using a non-distorted reference frame. Accordingly, $M_i$ will naturally be defined in the non-distorted world coordinate system of the world space 16.

Figure 4A:
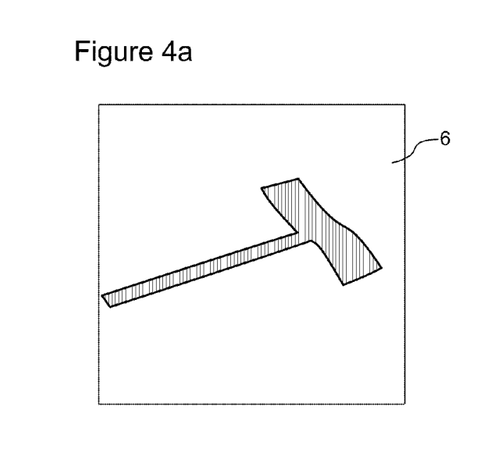
FIGS. 4a-c schematically illustrate successive image processing steps in the process of FIG. 3.
Figure 4B:
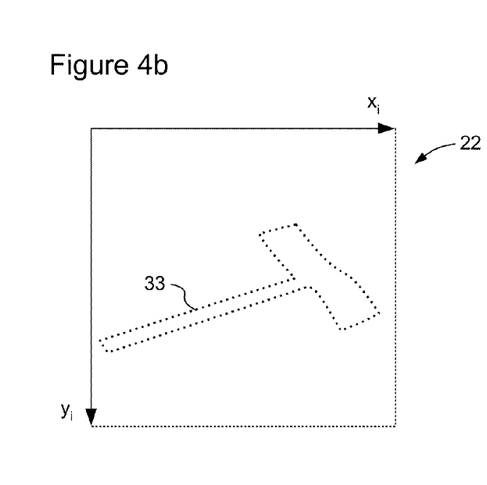

An alternative method of obtaining $M_i$ is to use (at 31) the camera 4 to acquire an image 6 of a physical archetype placed in the world space 16. FIG. 4*a* shows an example of the acquired archetype image. Known algorithms can then be used to detect local geometric features 33 within the acquired image (at 32). As mentioned above, these local geometric features may be edge coordinates, points of interest or any other local features uniquely representing, as a set, the archetype. Edge coordinates can be isolated by any method known in the art, such as, for example as described by J. F. Canny, ("A Computational Approach to Edge Detection", IEEE Trans. On PAMI, Vol. 8, No. 6, 679-698, (1986)). FIG. 4*b* shows an example of detected edge points in the image space 22.

Figure 4C:
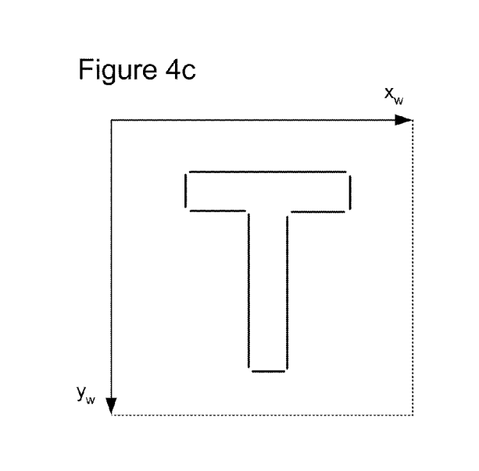

In accordance with the present invention, the detection of local geometric features 33 (step 32) is performed in the distorted image space 22, as shown in FIG. 4*b*. Thus the set of detected local geometric features (which may conveniently be represented by $M_i'$) contains all of the distortions inherent in the image space. The non-distorted set of local geometric features, $M_i$, can then be found by calculating $M_i=A_j(M_i')$ to map $M_i$ from the image space to the (non-distorted) world space (step 34, FIG. 3), as shown in FIG. 4*c*. If desired, $M_i$ can then be re-scaled to provide convenient dimensions for further numerical processing. Conveniently, such a re-scaling function may be incorporated into Ai and $A_{inverse-j}$. An advantage of this process of isolating local geometric features in image space, and then mapping $M_i'$ into $M_i$, is that it avoids the intensive image processing (pixel interpolation etc.) that is conventionally required to produce a non-distorted image, prior to local geometric feature detection. Another related advantage is that it obviates difficulties associated with image re-scaling and creation of regions of invalid pixels, that can occur during a pixel-by-pixel mapping between distorted and undistorted coordinate systems.

Referring again to FIG. 3, model data are obtained by processing (at 36) the non-distorted set of local geometric features, $M_i$, following the method chosen to perform pattern matching. In principle, any suitable pattern matching algorithm can be used for recognizing occurrences of a model in an acquired image. For example, a generalized Hough transform, or a known geometric hash based on points of interest, such as described by Lamdan and Wolfson ("Geometric hashing: A generalized and Efficient Model-based Recognition Scheme", Second International Conference on Computer Vision, December 1988, pp 238-249) may be used. The example of FIG. 3 uses the geometric hashing methods of Lamdan and Wolfson. Accordingly, $M_i$ is processed (at 38) to calculate geometric invariants by defining a plurality of bases, and calculating respective sets of coordinates of each local geometric feature relative to each one of the bases. The collection of geometric invariants can then be processed to derive the model data (at 40), such as, for example, by populating a hash table. The model data can then be saved (step 42) in the database 10 using a suitable data structure which facilitates efficient access, as is well known in the art. It will be appreciated that other pattern matching algorithms will normally require different model data. For example, the methods of Hough will not normally involve calculation of geometric invariants.

Figure 5:
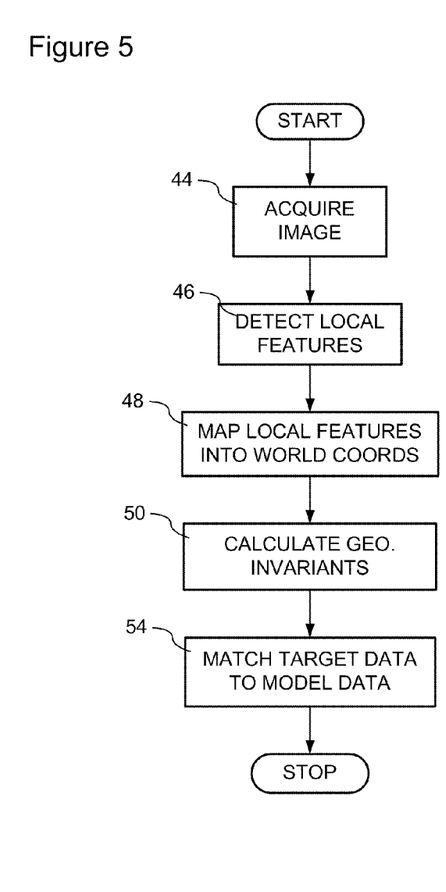
FIG. 5 is a flow chart illustrating principle steps in a process of finding an occurrence of a model in an acquired image in accordance with the present invention.

FIG. 5 is a flow chart illustrating principle steps in a process of finding an occurrence of a previously defined model in an acquired image 6 in accordance with the present invention. As may be seen in FIG. 5, the process of acquiring an image containing a target object (step 44); analyzing the image 6 in image space 22 to detect the set of local geometric features (steps 46); mapping the local geometric features in the distorted image space into the set of non-distorted local geometric features in the world coordinate system (step 48); and then calculating geometric invariants (step 50) closely follows the corresponding steps 31-38 described above for obtaining model data.

Figure 6A:
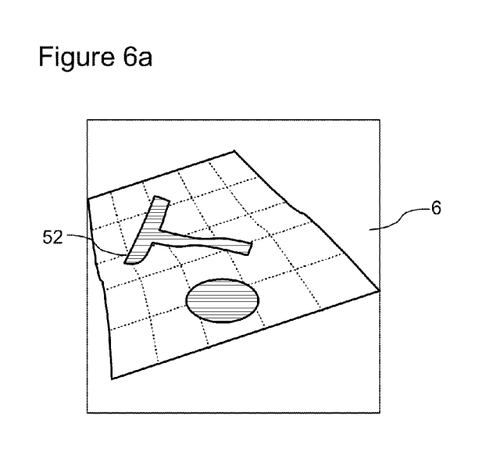
FIGS. 6a-c schematically illustrate successive image processing steps in the process of FIG. 5.
Figure 6B:
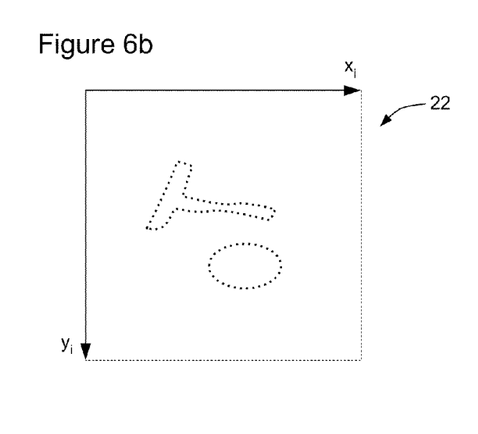
Figure 6C:
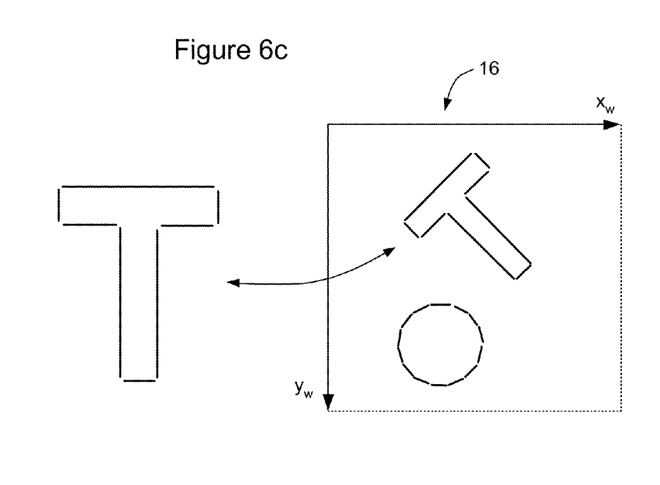

Thus the camera 4 acquires an image 6 of the world space 16, which includes a target object 52 that is to be recognized. FIG. 6*a* shows an exemplary acquired image containing one target object 52, and one other object. It will be appreciated that multiple target objects, and target objects of various different shapes may be accommodated by the present invention, by providing suitable model data in the database 10, and repeating the recognition steps as required for each target object. In any event, local geometric features within the acquired image 6 are detected (step 46). The set of local geometric features (which may conveniently be represented by T') isolated from the image 6 contains all of the distortions inherent in the image space. A non-distorted set of local geometric features, T, can be found by calculating $T=A_j(T')$ to map T' from the image space to the (non-distorted) world space (step 48), as shown in FIG. 6*c*. The non-distorted set of local geometric features, T, can then be processed to calculate geometric invariants (step 50), using the same algorithm used for analyzing the acquired archetype image (see FIGS. 3 and 4*a-b*). Similarly, the same geometric invariants are used to define the target image as were used to define the archetype.

Referring again to FIGS. 5 and 6*c*, recognition of the target object 52 in the image 6 is accomplished by matching (at step 54) the calculated set of geometric invariants to the model data saved in the database 10 in accordance with the previously selected pattern matching algorithm. For example, a generalized Hough transform, or a known geometric hash based on points of interest such as described by Lamdan and Wolfson ("Geometric hashing: A generalized and Efficient Model-based Recognition Scheme", Second International Conference on Computer Vision, December 1988, pp 238-249) may be used. These methods typically return information identifying a model most closely matching the target object 52, along with estimates of the location, orientation and scale of the target object. Since comparison between the set of geometric invariants, and the model data is conducted in the world coordinate system, these parameters will be defined in world coordinates.

Figure 7:
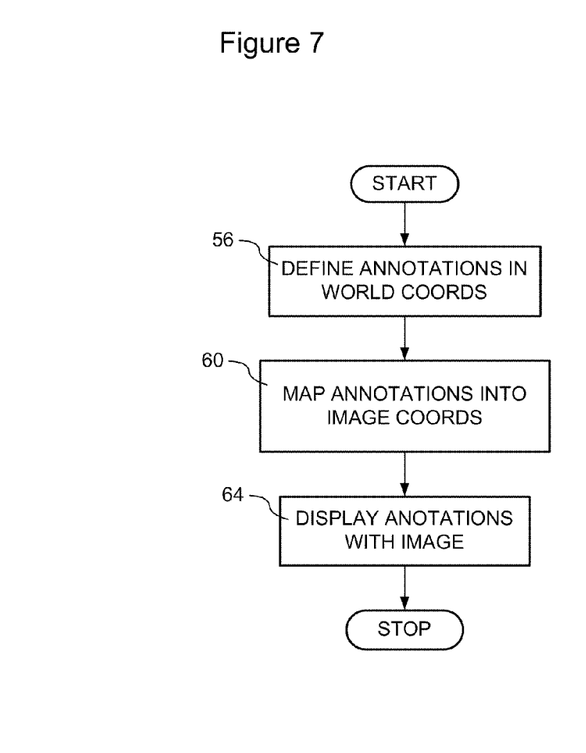
FIG. 7 is a flow chart illustrating principle steps in a process of adding annotations to a recognized object in an acquired image in accordance with the present invention.
Figure 8A:
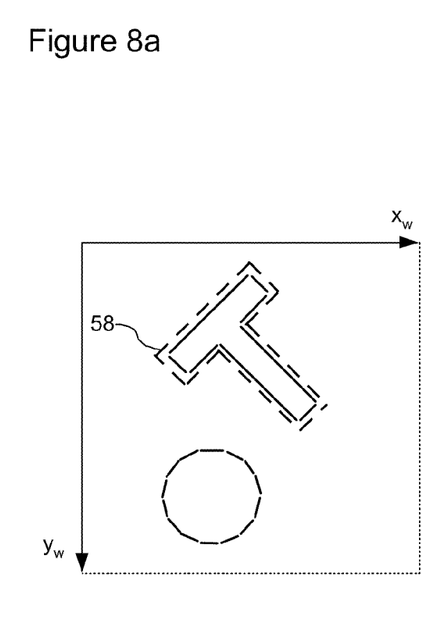
FIGS. 8a-b schematically illustrate successive image processing steps in the process of FIG. 7.
Figure 8B:
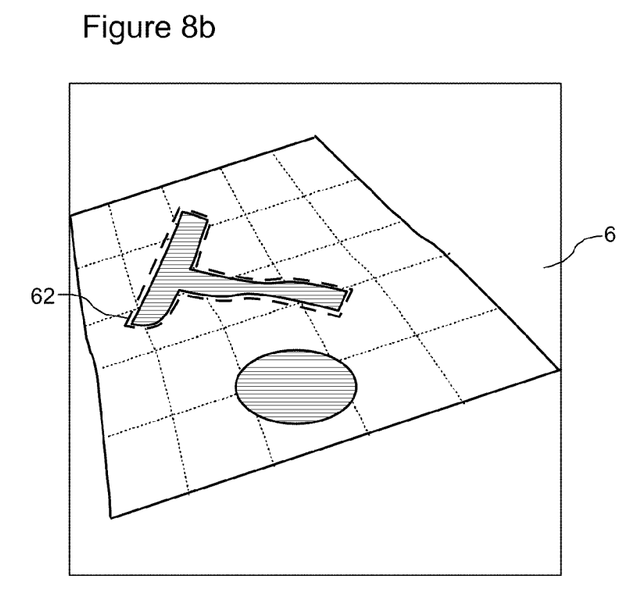

As will be appreciated, the image 6 acquired by the camera 4 may be directly displayed on a monitor, in a manner well known in the art. In some cases, it will be desirable to display various annotations within this displayed image. For example, it may be desirable to analyze the acquired image 6 to locate occurrences of two or more different models. When a model is found in the image 6, it may be desired to display an envelope (such as a polygon or an ellipsoid surrounding the object) or a "wire-frame" drawing of the model, properly positioned and oriented within the displayed image to assist a user in locating the target object. Additional information concerning the target object (e.g. object identification, size, etc.) may also be displayed in the image 6 as text. Again, any such additional information should be properly positioned within the image relative to the target object. FIG. 7 is a flow chart illustrating principle steps in a process of adding annotations to a recognized object in an acquired image in accordance with the present invention. FIGS. 8a and 8b schematically illustrate successive image processing steps in this process.

Referring to FIG. 7, at step 56, the location, orientation and scale information returned by the pattern matching algorithm is used to position (in the world coordinate system) a wire-frame drawing 58 of the identified model relative to the target object 52, as shown in FIG. 8a. The wire-frame drawing 58 can then be piece-wise mapped (step 60) to the "image space" using the inverse transformation function $A_{inverse-j}$. In a multi-camera system, the annotations will be mapped into the image space of the camera used to acquire the displayed image, using the respective inverse transformation function $A_{inverse-j}$ calculated for that image space. Piece-wise mapping of the wire-frame drawing 58 (and any other annotations) can be accomplished by segregating the drawing into a plurality of local elements having a desired granularity. Each local element can then be independently mapped into the image coordinate system using the inverse transformation function $A_{inverse-j}$. Finally, the mapped local elements can be "de-segregated", to close any gaps and resolve discontinuities introduced by the mapping operation. This piece-wise mapping produces a "distorted" wire-frame drawing 62 that can be directly displayed (step 64) superimposed over the image 6 acquired by the camera 4, as shown in FIG. 8b.

Referring again to FIG. 1, the processor 8 can be linked through a network 12 (e.g. the internet) to a remote workstation 14. This arrangement can be used to facilitate management of the system 2 from the remote workstation 14. Typical management functions may include remote monitoring, trouble-shooting of the operation of the processor 8, as well as installation of software up-grades. Because the model data is defined in world coordinates, and the processor 8 maps features from image space into world coordinates prior to pattern matching, the remote workstation 14 can also be used for definition of the model data.

In particular, model data can be prepared by the remote workstation 14, following the methods described above with respect to FIG. 3, independently of the deployment or implementation of the system 2 (consisting of the image acquisition device 4, processor 8, and world space 16). The only practical limitation of this independence is that the same world coordinate system must be used in the definition of the model and the world space 16. Upon installation of the system 2, a respective set of transformation functions $A_j$ and $A_{inverse-j}$ are calculated (for each camera of the system) in order to calibrate the environment of the system 2, and thereby enable mapping of coordinates between the image space 16 and the (predetermined) world coordinate system. Upon completion of the calibration step, the system 2 can proceed with object recognition using the (previously defined) model data. Because the system 2 is calibrated to the world coordinate system (in which the model data is defined), no modification of the model data is required in order to enable efficient object recognition by the system 2.

As may be appreciated, this aspect of the present invention enables a single model definition (world coordinate system, model data) to be used by multiple independently installed and calibrated systems 2. If desired, an instance of the model definition may be provided to each system 2, or they may access a common model definition (e.g. through the network 12).

The above description illustrates exemplary features of an embodiment of the invention in which the world space 16 is viewed by a single camera 4. However, it will be appreciated that multiple cameras 4 may be used. In such cases, the visual environment of each camera 4 must be individually calibrated, so that each camera will be associated with a respective set of transformation functions $A_j$ and $A_{inverse-j}$. Once each of the sets of transformation functions $A_j$ and $A_{inverse-j}$ have been defined, images acquired by each of the cameras 4 can be properly mapped into the same world space coordinates. Consequently, model data derived from an archetype image acquired by any one camera 4 can be used for finding target objects in images acquired by any of the other cameras. Thus it is not necessary to derive model data for each camera.

The embodiments of the invention described above are intended to be exemplary only. The scope of the invention is therefore intended to be limited solely by the scope of the appended claims.

We claim:

1. A method of annotating an image of an object located in a predetermined world space of an image processing system adapted to estimate at least a location of the object in the predetermined world space, the image processing system including a monitor for displaying the image, the method comprising the steps of:

calibrating the image processing system for the predetermined world space by determining a transformation between coordinates in an image coordinate system of the image and coordinates in a world coordinate system of the predetermined world space;

defining an annotation of the object relative to the estimated location of the object in the predetermined world space returned by the image processing system, the annotation being defined in the world coordinate system of the world space;

mapping the annotation into the image coordinate system using an inverse of the transformation between the image coordinate system and the world coordinate system, wherein mapping the annotation comprises piece wise mapping of the annotation by:

segregating the annotation into a plurality of local elements;

mapping each of the local elements into the image coordinate system; and desegregating the mapped local elements within the image coordinate system; and displaying the annotation of the object on the monitor in conjunction with the image of the object.

2. A method as claimed in claim 1, wherein the step of defining an annotation of the object comprises any one or more of:

defining an envelope in the world coordinate system encompassing the estimated location of the object in the predetermined world space;

defining an indicator positioned at the estimated location of the object in the predetermined world space;

defining text information at a predetermined position relative to the estimated location of the object in the predetermined world space; and defining a wire-frame drawing tracing at least a portion of an outline of the object in the predetermined world space.

3. A method as claimed in claim 2, wherein defining an envelope comprises defining either one of a polygon and an ellipsoid surrounding the estimated location of the object in the predetermined world space.

4. A method as claimed in claim 2, wherein the image processing system is further adapted to estimate an orientation of the object in the predetermined world space, and wherein defining an envelope further comprises defining an orientation of the envelope to approximate the estimated orientation of the object in the predetermined world space.

5. A method as claimed in claim 1, wherein displaying the annotation comprises either one of:
 mapping the annotation into an overlay buffer associated with the monitor; and
 mapping the annotation directly into a display buffer of the monitor.

* * * * *